United States Patent [19]
Swamy et al.

[11] Patent Number: 5,805,148
[45] Date of Patent: Sep. 8, 1998

[54] MULTISTANDARD VIDEO AND GRAPHICS, HIGH DEFINITION DISPLAY SYSTEM AND METHOD

[75] Inventors: Kumar B. Swamy, Milpitas; Patrice J. Capitant, Los Altos; Michael T. Mackay, Vallejo; Vinson R. Perry, San Carlos, all of Calif.

[73] Assignees: Sony Corporation, Tokyo, Japan; Sony Electronics, Inc., Park Ridge, N.J.

[21] Appl. No.: 567,854

[22] Filed: Dec. 6, 1995

Related U.S. Application Data

[63] Continuation of Ser. No. 818,744, Jan. 7, 1992, abandoned, which is a continuation of Ser. No. 513,808, Apr. 24, 1990, abandoned.

[51] Int. Cl.$^6$ ........................................................ G09G 5/36
[52] U.S. Cl. ................................................. 345/189; 345/201
[58] Field of Search .................................. 340/747, 721, 340/723, 724; 358/903, 181, 183, 22; 345/185, 187, 189, 192, 201, 202, 150; 348/584, 589, 598, 600

[56] References Cited

U.S. PATENT DOCUMENTS

| | | | |
|---|---|---|---|
| 4,070,695 | 1/1978 | Scholz et al. | 358/181 |
| 4,139,860 | 2/1979 | Micic et al. | 358/22 |
| 4,238,773 | 12/1980 | Tsuboka et al. | 358/183 |
| 4,249,213 | 2/1981 | Imaide et al. | 358/183 |
| 4,266,242 | 5/1981 | McCoy | 358/22 |
| 4,425,581 | 1/1984 | Schweppe et al. | 358/148 |
| 4,533,952 | 8/1985 | Norman, III | 358/160 |
| 4,542,376 | 9/1985 | Bass et al. | 340/724 |
| 4,612,569 | 9/1986 | Ichinose | 358/22 |
| 4,618,859 | 10/1986 | Ikeda | 340/724 |
| 4,623,915 | 11/1986 | Bolger | 358/22 |
| 4,626,837 | 12/1986 | Priestly | 340/723 |
| 4,636,864 | 1/1987 | Annegarn et al. | 358/191.1 |
| 4,665,438 | 5/1987 | Miron et al. | 358/183 |

(List continued on next page.)

FOREIGN PATENT DOCUMENTS

| | | |
|---|---|---|
| 0 222 025 | 5/1987 | European Pat. Off. . |
| 0 263 393 | 4/1988 | European Pat. Off. . |
| 0 276 800 | 8/1988 | European Pat. Off. . |
| 0 404 393 | 12/1990 | European Pat. Off. . |
| 2174266 | 10/1986 | United Kingdom ............. H04N 7/08 |

OTHER PUBLICATIONS

Gerald Keith Lunn, Tong Hing Yip, Kwan Tak Ming, "A Multisystems On Screen Display For TV MCU", IEEE Transactions on Consumer Electronics, Nov. 1989, No. 4, pp. 803–809.

A. Fernandez, H. Gaggioni, M. Jaquez, J. Robbins, S. Soper, "A Raster Assembly Processor (RAP) For Integrated HDTV Display Of Video And Image Windows", IEEE/IEICE, Global Telecommunications Conference Record, Nov. 15–18, 1987, Tokyo, Japan, vol. 2, pp. 731–739.

T. Fujimori, H. Gaggioni, M. Imani, N. Ichikawa, H. Hirase, M. Terada, K. Hata, "A Very High Resolution, 16.7 Million-color HDTV Graphic System", 23rd Annual SMPTE Television Conference in San Francisco, CA., Feb. 3–4, 1989, pp. 218–239.

(List continued on next page.)

*Primary Examiner*—Chanh Nguyen
*Attorney, Agent, or Firm*—Limbach & Limbach L.L.P

[57] ABSTRACT

An interactive high definition display system generates its own graphics display data, accepts multiple video signals and graphics display signals based upon multiple standards, and selectively produces therefrom an integrated video and graphics display featuring multiple images or compositing. The incoming video signals are decoded into their corresponding RGB signals, digitized and written into memory. The incoming and internally generated graphics display data signals are also written into memory. According to preprogrammed instructions, or interactively according to instructions received via a computer interface, an integrated, multiple image or composite display pattern with both active video and graphics display images can be generated by selecting from and arranging for display the stored video and graphics display data, and viewed on a high definition display or stored on a high definition video tape recorder.

14 Claims, 2 Drawing Sheets

U.S. PATENT DOCUMENTS

| | | | |
|---|---|---|---|
| 4,673,983 | 6/1987 | Sarugaku et al. | 358/183 |
| 4,680,622 | 7/1987 | Barnes et al. | 358/22 |
| 4,694,343 | 9/1987 | Flora | 358/183 |
| 4,694,344 | 9/1987 | Flora | 358/183 |
| 4,698,664 | 10/1987 | Nichols et al. | 358/10 |
| 4,725,888 | 2/1988 | Hakamada | 358/183 |
| 4,729,027 | 3/1988 | Hakamada et al. | 358/183 |
| 4,729,028 | 3/1988 | Micic et al. | 358/183 |
| 4,746,983 | 5/1988 | Hakamada | 358/183 |
| 4,761,688 | 8/1988 | Hakamada | 358/183 |
| 4,774,582 | 9/1988 | Hakamada et al. | 358/183 |
| 4,777,531 | 10/1988 | Hakamada et al. | 358/183 |
| 4,839,728 | 6/1989 | Casey | 358/183 |
| 4,876,600 | 10/1989 | Pietzsch et al. | 358/183 |
| 4,935,815 | 6/1990 | Ichikawa et al. | 358/183 |
| 4,947,257 | 8/1990 | Fernandez et al. | 358/183 |
| 4,994,912 | 2/1991 | Lumelsky et al. | |
| 4,995,598 | 2/1991 | Hara | 358/22 |

OTHER PUBLICATIONS

Peter D. Symes, "Multilevel Compositing in the Digital Domain", S.M.P.T.E. Journal, Aug. 1988, No. 8, pp. 613–615.

Graham J. Deaves, "A Component Analog News Studio Center", S.M.P.T.E. Journal, Nov. 1987, No. 11, pp. 1068–1072.

M. Uilrich, M. Hegendorfer, "TV Receiver Puts Two Pictures On Screen at Same Time," Electronics Magazine, Sep. 1, 1977, pp. 102–106.

M. Masuda, T. Kuroyanagi, T. Imaide, H. Nabeyama, "Fully Digitalized Color Picture In Picture Television System," IEEE Transactions on Consumer Electronics, vol. CE–25, Feb. 1979, pp. 152–159.

MULTISTANDARD VIDEO AND GRAPHICS, HIGH DEFINITION DISPLAY SYSTEM AND METHOD

This is a continuation of application Ser. No. 07/818,744 filed on Jan. 7, 1992, now abandoned, which is a File Wrapper Continuation of prior application 07/513,808, dated Apr. 24, 1990, now abandoned.

BACKGROUND OF THE INVENTION

1. Field of the Invention

The present invention relates to high definition display systems. In particular, the present invention relates to high definition video and graphics display systems which provide for simultaneous display of multiple video and graphics images.

2. Description of the Related Art

As applications for video and graphics display systems have become more varied and more sophisticated, the limitations of existing display systems have become more burdensome. In particular, many different applications for video and graphics display systems require an integrated, multiple image or composite display pattern with both active video and graphics display images. Furthermore, frequently the video and graphics information to be displayed is based upon multiple standards (e.g., NTSC, PAL, SECAM, 1125/60 SMPTE 240M, etc.). Moreover, even once displayed, the video and graphics information must typically be updated, changed or otherwise manipulated on a real-time basis.

Examples of such applications include: post-production editing of film and television recordings where multiple images from multiple cameras must be edited together; multi-media workstations where both video and graphics information must be somehow combined for viewing; and "situation rooms," such as those used by governmental or military agencies, where video and graphics information available from numerous sources (e.g., airborne cameras, radar, satellite photographs, etc.) must be viewed together.

Currently, such simultaneous viewing of multiple video and graphics images must be done by using multiple, individual display devices (e.g., cathode ray tubes, liquid crystal displays, etc.), particularly when the video and graphics information to be displayed is based upon multiple standards. Furthermore, even if the video and graphics information to be displayed is based upon a single standard, simultaneous display on a single display device typically results in a poor, low resolution display.

Thus, it would be desirable to have a video and graphics display device capable of producing an integrated, multiple image video and graphics display with substantially increased resolution without regard to the original signal standards or formats upon which the displayed video and graphics information was initially based.

It would be further desirable to have such a display system which would allow the selective arrangement and mixing of video and graphics information for simultaneous display. It would be still further desirable to have such a display system which would allow such selective arrangement, mixing and display of video and graphics information interactively.

SUMMARY OF THE INVENTION

A high definition display system in accordance with the present invention accepts, as input signals, video signals and graphics display data signals from multiple sources. The inputted video signals can be selectively based upon any video standard (e.g., NTSC, PAL, SECAM, 1125/60 SMPTE 240M, etc., as well as their analog or digital variations). These multiple signals can be selectively and interactively arranged into an integrated pattern of multiple images for display on a single high definition display. Thus, the high definition display system in accordance with the present invention advantageously capitalizes on the increased resolution and display area of a high definition display.

Multiple, replaceable subassemblies are selected and used for receiving and decoding multiple input video signals, according to each subassembly's ability to receive and decode the desired video standard signal. All subassemblies decode their respective video signals into one common format (e.g., red, green and blue ("RGB") video signals). Each subassembly further contains circuitry for digitizing its received and decoded video signal and storing up to two frames' worth of digitized video data therefrom. The decoded and digitized video data from all video decoding subassemblies is stored in a larger memory (e.g., a random access memory ("RAM")). It is from this larger memory that the desired input video signals are selected and arranged for display in a high definition format.

A high definition display system in accordance with the present invention further provides a graphics display capability. Graphics display data can selectively be generated internally or received from external graphics display data sources. This graphics display data is stored in a memory from which it can be later selected and arranged for display in a high definition format.

A high definition display system in accordance with the present invention further includes a programmable display controller which selects video data and graphics display data from their associated memories and arranges them within a common display memory for display in a selectable pattern. This selection and arrangement of the video and graphics display data can be done interactively by the system user via a computer interface (e.g., external computer workstation). The programmable display controller can further replicate or relocate, within the display memory, the stored display data to adjust the shapes or sizes of the displayed images or to provide for panning or zooming in or out on a subject within a displayed image.

Thus, the replaceable video decoder subassemblies provide built-in frame synchronization by providing the capability of receiving multiple full bandwidth video signals based upon multiple standards, converting them all to one common RGB format, and digitizing them for storage. The storing of all inputted (and decoded) video signals and graphics display data in a memory allows the video and graphics images to be selected therefrom and arranged in another memory in patterns as desired for display in a high definition format.

Furthermore, these digitized full bandwidth video signals can be made available for recording, i.e., storing, on a digital video tape recorder. This allows the greater storage capacity of videotape (e.g., as compared to disk storage devices) to be used to its full advantage.

Moreover, the computer interface allows this selection and arrangement of video and graphics images for display to be carried on in a programmed or interactive mode, thereby allowing the system user to selectively vary the high definition display.

These and other objectives, features and advantages of the present invention will be understood upon consideration of the following detailed description of the invention and the accompanying drawings.

BRIEF DESCRIPTION OF THE DRAWINGS

Throughout the figures, corresponding elements are designated with like numerals.

DETAILED DESCRIPTION OF THE INVENTION

Figure 1:
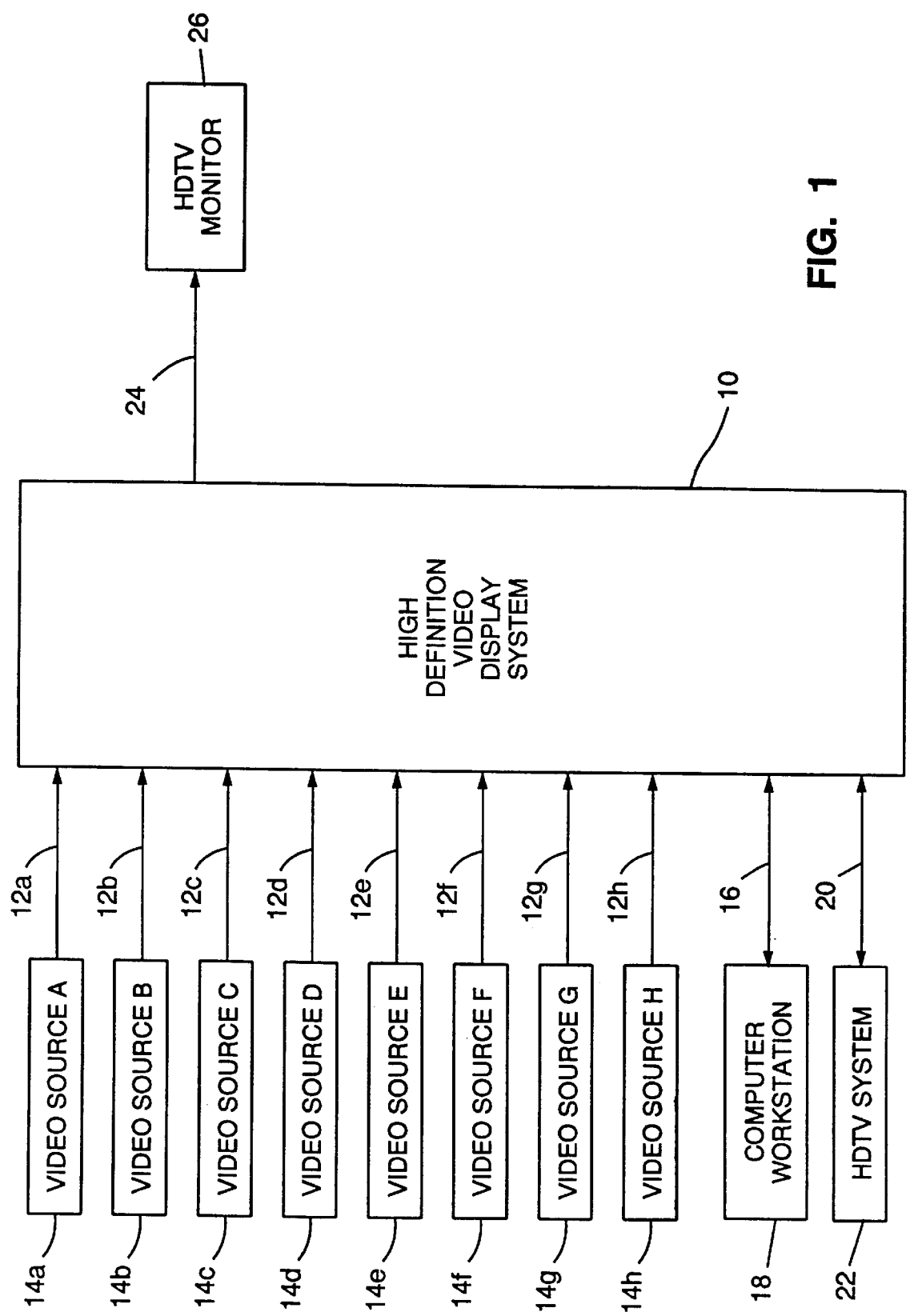
FIG. 1 illustrates in simplified block diagram form a typical operating environment for a high definition display system in accordance with the present invention.

Referring to FIG. 1, the high definition ("HD") display system 10 receives video signals 12a–12h, inclusive, from eight external video sources 14a–14h, respectively. Alternatively, some or all of the received signals 12a–12h can consist of graphics display data with the corresponding external sources 14a–14h consisting of graphics display data sources.

The HD display system 10 also has an interface 16 with a computer workstation 18. Over this interface 16 the HD display system 10 and computer workstation 18 can exchange instructions or graphics display data.

The HD display system 10 also has an interface 20 with a high definition television ("HDTV") system 22. Through this interface 20, the HD display system 10 can exchange HDTV signals with the external HDTV system 22. For example, the HDTV system 22 can consist of an HDTV video tape recorder ("VTR"), with which the HD display system 10 can exchange analog or digital high definition video signals. Alternatively, the HDTV system 22 can be another analog or digital system requiring the high speed, duplex operation of the HDTV interface 20.

The HD display system 10 further has an interface 24 with an HDTV monitor 26. Through this interface 24, the HD display system 10 outputs its high definition video display information for display on the monitor 26. The interface 24 can carry either analog or digital HD video information. For example, analog HD video information can be outputted for display by the monitor 26 or recording on an analog HD VTR (not shown), and digital HD video information can be outputted for recording on a digital HD VTR (not shown).

Figure 2:
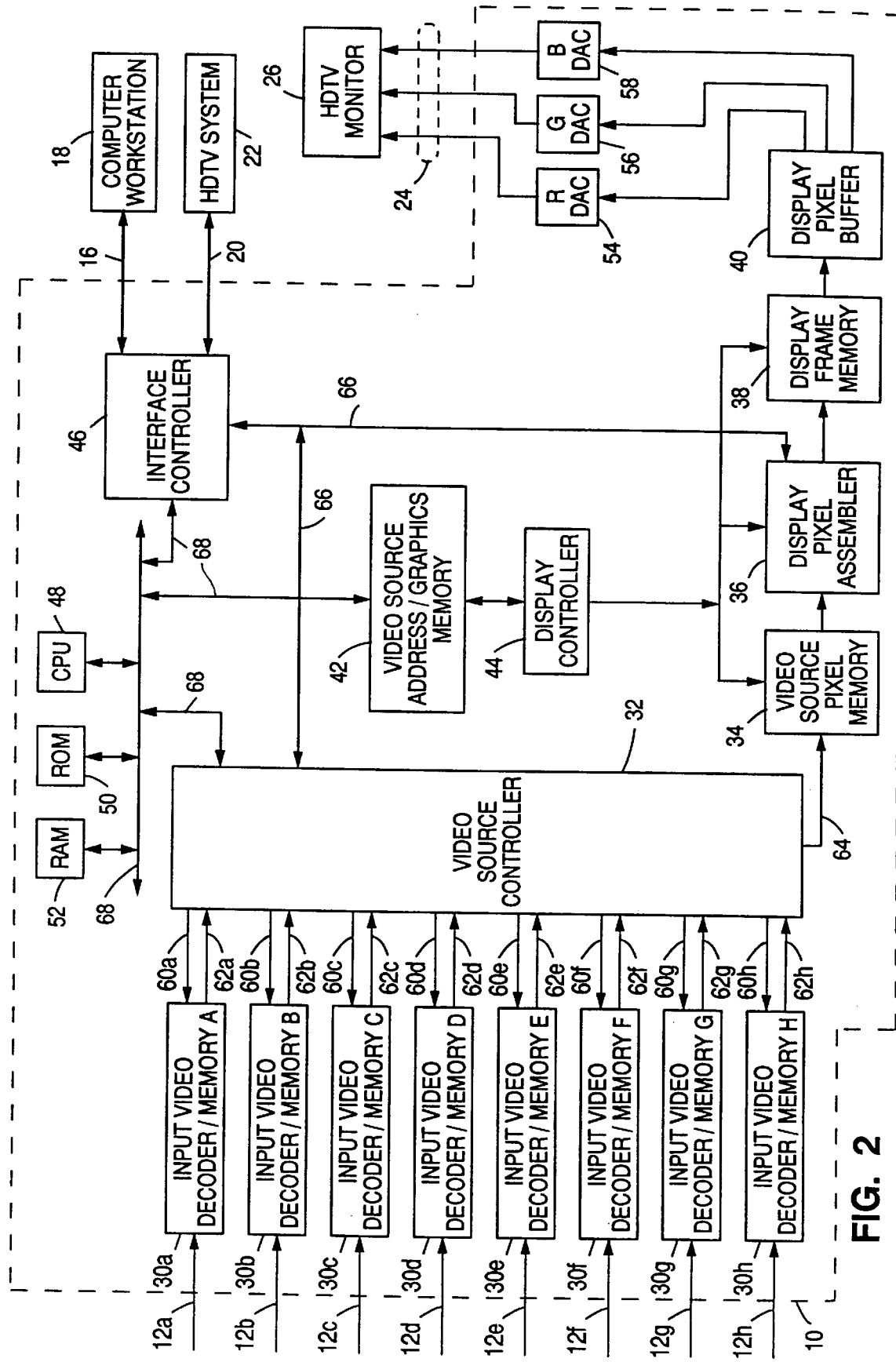
FIG. 2 illustrates in simplified block diagram form the major functional elements and architecture of a high definition display system in accordance with the present invention.

FIG. 2 illustrates in more detailed block diagram form the major functional elements and architecture of the HD display system 10 in accordance with the present invention. As described further below, the incoming video signals 12a–12h, inclusive, are each processed by the separate, corresponding input video decoder/memory units 30a–30h, respectively, and a video source controller 32.

As will be appreciated by one of ordinary skill in the art, the decoder/memory units 30a–30h can be designed to accept and process graphics display data signals rather than video signals if so desired. Regardless of whether the incoming signals 12a–12h are video or graphics display data, once they are processed by the respective decoder/memory units 30a–30h, their subsequent processing is not affected.

The processed video or graphics display information 64 is then stored, arranged and buffered by a video source pixel memory 34, a display pixel assembler 36, a display frame memory 38 and a display pixel buffer 40, respectively. The selection and arrangement of the video or graphics display information to be displayed is performed by a video source address/graphics memory 42 and a display controller 44.

The memories 34, 38, 42, assembler 36, buffer 40 and controller 44 can be designed to be constructed from standard devices which are known in the art, such as standard logic devices, random access memory devices or programmable logic devices.

Graphics display data or interactive commands 16 for controlling the displayed images are received from the computer workstation 18 through the interface 16 via the interface controller 46. The interface controller 46 also provides for the exchange of digital data through an interface 20 with the external HDTV system 22 (e.g., via an external data bus). A resident central processing unit ("CPU") 48 and associated read only memory ("ROM") 50 and random access memory ("RAM") 52, which are connected to the various circuits via a CPU bus 68, provide for performing internal diagnostic testing of the HD display system 10 and generating graphics display data for display.

The incoming video signals 12a–12h, inclusive, are first individually processed by the input video decoder/memory units 30a–30h, respectively. This processing includes synchronizing the video signals 12a–12h, respectively, after which they are each decoded into their red, green and blue ("RGB") video signal equivalents, digitized and written into memory. This digitized video information is written into memory on a frame-by-frame basis. The capacity of this memory is two frames' worth of video data for each video signal 12a–12h, inclusive, so that while one frame is being written, the previously stored frame can be read out by the video source controller 32.

The input video decoder/memory units 30a–30h, inclusive, comprise individual, replaceable circuit card subassemblies. Each subassembly 30a–30h is self-contained in the sense that each one includes all circuitry necessary to synchronize, decode, digitize and store (two frames' worth of) its input video signal 12a–12h, respectively. By being self-contained and replaceable, and further by converting all inputted video signals 12a–12h, inclusive, into their respective RGB video signal equivalents, the subassemblies 30a–30h, inclusive, can be individually selected according to the standards or formats upon which their associated input video signals 12a–12h, respectively, are based (e.g., NTSC, PAL, SECAM, 1125/60 SMPTE 240M, etc., as well as their analog or digital variations).

The video source controller 32 sends control signals 60a–60h to the input video decoder/memory units 30a–30h, respectively, whereupon the corresponding decoded, digitized and stored video data 62a–62h, respectively, are sent to the video source controller 32. These decoded and digitized video data signals 62a–62h, inclusive, are sent over an interface 64 to the video source pixel memory 34 for storage.

An additional source of video data which can be included within the output signal 64 of the video source controller 32 is the HDTV system 22. Digital video data received from the HDTV system 22 is placed upon the internal video data bus 66 by the interface controller 46. Alternatively, analog video data received from the HDTV system 22 can first be digitized by the interface controller 46 and then placed upon the internal video data bus 66. The video source controller 32 can then receive this HDTV video data via the video data bus 66 and include it in its output signal 64.

Graphics display data can arrive from three different sources: the computer workstation 18, the HDTV system 22 or the internal CPU 48. If graphics display data originates within the computer workstation 18 or HDTV system 22, it is received via the interface controller 46 and placed upon the CPU bus 68. If it originates within the resident CPU 48, it is placed directly upon the CPU bus 68. The graphics display data on the CPU bus 68 is received by the video source address/graphics memory 42 and stored therein.

Display of the selected graphics display and video image data is accomplished by reading out the selected graphics display data from the video source address/graphics memory 42 and reading out the selected video image data from the video source pixel memory 34. To read the selected video image data from the video source pixel memory 34, the appropriate memory address information therefor must be supplied to the video source pixel memory 34. This memory address information can be supplied by the resident CPU 48 if it has been preprogrammed to do so, or alternatively, it can be supplied by the system user via the computer workstation 18 and interface controller 46.

It will be appreciated by one of ordinary skill in the art that the addressing information supplied by the user via the computer workstation 18 can itself be preprogrammed or be supplied interactively (e.g., via a computer keyboard or "mouse," joy stick, etc.), in which latter case, the system user can interactively select the video image data to be displayed. In either case, the memory address information is supplied to the video source address/graphics memory 42 via the CPU bus 68.

To select and arrange for display the video image or graphics display data, the display controller 44 begins reading out the video source address information or graphics display data from the video source address/graphics memory 42. With each byte (or series of bytes) representing video source address information or graphics display data there is also stored an extra bit which indicates whether the associated byte (or bytes) represent video source address information or graphics display data (e.g., "0" for video source address information and "1" for graphics display data).

Depending upon whether the information read out from the video source address/graphics memory 42 is video source address information or graphics display data, the display controller 44 does one of two things. If the information being read out is video source address information, the display controller 44 accesses the video image data specified thereby in the memory location within the video source pixel memory 34, and causes that video image data to be transferred to the display pixel assembler 36. If however, the information being read is graphics display data, the display controller 44 sends that graphics display data directly to the display pixel assembler 36.

Therefore, it is within the display pixel assembler 36 that the selected video image data, retrieved from the video source pixel memory 34, or the graphics display data, retrieved from the video source address/graphics memory 42, are assembled before being arranged into the desired pattern of displayed images. In other words, by loading the appropriate video source address information and appropriate graphics display data into the video source address/graphics memory 42, the selected video image data from the video source pixel memory 34 or the selected graphics display data can be assembled and arranged for display as desired by using the display pixel assembler 36 as the staging area therefor. The desired display arrangement can be preprogrammed within the video source address/graphics memory 42 or controlled interactively via the computer workstation 18.

As selected HD video image data or graphics display data is being assembled within the display pixel assembler 36, it is transferred to the display frame memory 38. This is done so that the selected HD video image or graphics display data can be arranged within the display frame memory 38 and displayed while further selected HD video image or graphics display data to be displayed is assembled within the display pixel assembler 36.

The frame of selected and arranged HD video image and graphics display data is read out from the display frame memory 38 to the display pixel buffer 40 on a pixel-by-pixel basis. Since the display data has been processed in digital form, it is next passed through digital-to-analog converters ("DACs") 54, 56, 58 for conversion to analog form. The selected and arranged, analog display data 24 is then outputted to the HDTV monitor 26 for display. The HDTV monitor 26 produces the desired video or graphics display pattern according to the selection and arrangement of video image or graphics display data, as described above.

Alternatively, the digital RGB signals can be outputted directly from the display pixel buffer, bypassing the DACs 54, 56, 58, for recording on a digital video tape recorder.

This selection and arrangement of video image data or graphics display data allows the displayed images to appear in a selectable pattern of "windows" on the screen of the HDTV monitor 26. The windows can be adjacent to or overlapping one another and of virtually any shape or size. Each window can be selectively "sized" by appropriately addressing its associated stored video image or graphics display data.

For example, a window can be made larger or smaller by addressing more or less, respectively, of its associated stored video image or graphics display data. Furthermore, the displayed image within each window can be altered in manners known in the art. For example, by appropriately replicating or deleting the stored video image or graphics display data, the window can be made to appear to "zoom in" or "zoom out," respectively, on an image subject within the window, thereby "sizing" the image within the window. Alternatively, the window can be made to appear to "pan" or "scroll" an image subject within the window by consecutively changing the addresses.

It should be understood that various alternatives to the embodiments of the present invention described herein can be employed in practicing the present invention. It is intended that the following claims define the scope of the present invention and that structures and methods within the scope of these claims and their equivalents be covered thereby.

What is claimed is:

1. An improved video and graphics signal storage and display system of the type including video signal receiving and storage circuits, wherein the improvement comprises:

video signal decoder and digitizer means, included within the receiving and storage circuits, for receiving and decoding a plurality of video signals into their corresponding RGB signal components and for digitizing and storing the RGB signals;

a source of graphics data signals;

graphics data storage means connected to the graphics data signal source for storing the graphics data signals;

display signal selector and arranger means for selectively retrieving a plurality of stored signals from among the stored RGB signals and the stored graphics data signals, and for arranging and re-storing the selectively retrieved RGB and graphics data signals in a selected display-mapped pattern, and further for further retrieving and re-storing the re-stored RGB and graphics data signals in the selected display-mapped pattern for unconditional, independent, simultaneous retrieval and display of all of the RGB and graphics data signals in the selected display-mapped pattern.

2. An improved video and graphics signal storage and display system as recited in claim 1 wherein the source of graphics data signals comprises:
graphics data signal generator means for generating graphics data signals; and
graphics data signal input means for receiving a graphics data signal input from an external source.

3. An improved video and graphics signal storage and display system as recited in claim 1 wherein the display signal selector and arranger means comprises display pixel memory means for storing the selected RGB signals and the selected graphics data signals.

4. A video and graphics display system comprising:
video signal decoder and digitizer means for decoding and digitizing a plurality of video signals;
video signal memory means connected to the video signal decoder and digitizer means for storing the digitized video signals; and
display selector and arranger means connected to the video signal memory means for selectively retrieving a plurality of the stored video signals, and for arranging and re-storing the selectively retrieved video signals in a selected display-mapped pattern, and further for further retrieving and re-storing the re-stored RGB and graphics data signals in the selected display-mapped pattern for unconditional, independent, simultaneous retrieval and display of all of the RGB and graphics data signals in the selected display-mapped pattern.

5. A video and graphics display system as recited in claim 4, the system further comprising graphics data signal generator means for generating a graphics data signal, graphics data signal receiving means for receiving a graphics data signal supplied by an external source, and a graphics data signal memory for storing the generated and received graphics data signals, wherein the display selector and arranger means is connected to the graphics data signal memory and can further select from among the stored graphics data signals.

6. A video and graphics display system as recited in claim 5, wherein the video signal decoder and digitizer means comprises a plurality of circuit card assemblies, at least one of the circuit card assemblies containing circuitry for decoding a video signal into its corresponding RGB signals and for digitizing the RGB signals.

7. A video and graphics display system as recited in claim 5, wherein the video signal decoder and digitizer means comprises a plurality of circuit card assemblies, at least one of the circuit card assemblies containing circuitry for selectively decoding a graphics data signal into its corresponding RGB signals and for selectively digitizing the RGB signals.

8. A video and graphics display system as recited in claim 5, wherein the display selector and arranger means further comprises video source pixel memory means for storing the digitized video signals in a pixel mapped format.

9. A video and graphics display system as recited in claim 8, wherein the display selector and arranger means further comprises addressing means for programmably addressing memory locations within the video source pixel memory means to access the selected signals and reading means for reading the stored graphics data signals, and still further comprises a display frame memory for storing the arranged signals.

10. A video and graphics display system as recited in claim 5, wherein the display selector and arranger means comprises computer interface means coupled to receive signals from an external computer for interactively designating the selection of the stored signals and the arrangement of the selected signals.

11. A video and graphics display system as recited in claim 5, wherein the graphics data signal generator means comprises a microprocessor circuit, further wherein the graphics data signal receiving means comprises a data bus interface circuit coupled to receive an externally generated graphics data signal.

12. A method for providing a multiple image video display, the method comprising the steps of:
decoding multiple video signals;
digitizing the decoded video signals;
storing the digitized video signals;
selectively retrieving a plurality of the stored signals;
arranging and re-storing the selectively retrieved signals in a selected display-mapped pattern;
further retrieving and re-storing the re-stored RGB and graphics data signals in the selected display-mapped pattern; and
displaying all of the re-stored signals unconditionally, independently of and simultaneously with the arranging and re-storing of the selectively retrieved signals in a selected display-mapped pattern.

13. A method for providing a multiple image video display as recited in claim 12, the method further comprising the steps of:
selectively generating a graphics data signal;
selectively receiving a graphics data signal from an external source;
storing the generated and received graphics data signals; and
including the stored graphics data signals when selecting from among the stored signals.

14. A method for providing a multiple image video display as recited in claim 12, the method further comprising the step of interactively controlling the performance of the steps of selecting from among the stored signals and arranging and storing the selected signals.

* * * * *